(12) United States Patent
Gupta et al.

(10) Patent No.: US 12,140,260 B2
(45) Date of Patent: Nov. 12, 2024

(54) PIPELINE SPOOL PIECE SEAL ASSEMBLY AND METHOD OF USE

(71) Applicant: Oceaneering International, Inc., Houston, TX (US)

(72) Inventors: Abhineet Gupta, New Delhi (IN); Pardeep Kumar Kaundai, Punjab (IN); Ashish Negi, Punjab (IN); Nilesh Patil, Ravet (IN); Vikrant Verma, Haryana (IN); Douglas Allen Watkins, Magnolia, TX (US)

(73) Assignee: Oceaneering International, Inc., Houston, TX (US)

( * ) Notice: Subject to any disclaimer, the term of this patent is extended or adjusted under 35 U.S.C. 154(b) by 370 days.

(21) Appl. No.: 17/730,330

(22) Filed: Apr. 27, 2022

(65) Prior Publication Data
US 2022/0341531 A1 Oct. 27, 2022

(51) Int. Cl.
*F16L 55/17* (2006.01)
*F16L 55/18* (2006.01)

(52) U.S. Cl.
CPC ......... *F16L 55/171* (2013.01); *F16L 55/1705* (2013.01); *F16L 55/18* (2013.01)

(58) Field of Classification Search
CPC ...... F16L 55/171; F16L 55/1705; F16L 55/18
See application file for complete search history.

(56) References Cited

U.S. PATENT DOCUMENTS

| | | | | |
|---|---|---|---|---|
| 2,434,846 A | * | 1/1948 | Hagan | F16L 19/086 285/8 |
| 3,186,488 A | * | 6/1965 | Johnson | E21B 33/043 285/123.3 |
| 3,537,483 A | * | 11/1970 | Teague, Jr. | F16L 55/134 138/93 |
| 4,330,143 A | * | 5/1982 | Reneau | F16L 55/1608 285/348 |
| 4,909,281 A | * | 3/1990 | Reaux | F16L 55/136 138/97 |
| 5,293,905 A | * | 3/1994 | Friedrich | F16L 55/1283 166/135 |
| 6,286,553 B1 | * | 9/2001 | Morgan | F16L 55/1125 220/323 |
| 11,346,488 B1 | * | 5/2022 | Walls | F16L 55/1683 |
| 2005/0241711 A1 | * | 11/2005 | Sayers | F16L 55/1141 138/90 |
| 2007/0023096 A1 | * | 2/2007 | Buckley | F16L 55/132 73/49.8 |

(Continued)

*Primary Examiner* — David R Deal
(74) *Attorney, Agent, or Firm* — Maze IP Law, P.C.

(57) ABSTRACT

Seal assembly 100, useful for repairing an uncontrolled surface such as pipeline 110, comprises seal 102 which is subjected to pressure and temperature and remains operable under, e.g., subsea conditions. Seal assembly 100 is capable of sealing pipelines of diameters up to 48 inches. Seal assembly 100 is actuated/energized by axially compressing/loading seal assembly 100 between one or more controlled surfaces and an uncontrolled surface and can be used for repairing and providing sealing in flowline or pipelines of either subsea or other petrochemical industries where the pipelines. Spool assembly 700 comprising seal assembly 100 may be used to repair a damaged pipeline section after the damaged section is removed to provide a sealed replacement fluid path for the pipeline.

20 Claims, 11 Drawing Sheets

(56) References Cited

U.S. PATENT DOCUMENTS

| | | | | |
|---|---|---|---|---|
| 2007/0096400 A1* | 5/2007 | Shaw | ................ | F16L 23/18 |
| | | | | 277/510 |
| 2020/0141529 A1* | 5/2020 | Charles | ............... | E21B 33/1216 |
| 2020/0309292 A1* | 10/2020 | Baker | ................... | F16L 15/008 |

* cited by examiner

PIPELINE SPOOL PIECE SEAL ASSEMBLY AND METHOD OF USE

RELATION TO PRIOR APPLICATIONS

This invention claims priority through India Provisional Application 202111019214, filed 27 Apr. 2021.

TECHNICAL FIELD

The claimed invention relates generally to a field of pipeline repair and, more particularly, to a sealing member for repairing a pipeline, and a pipeline spool piece seal assembly incorporating the sealing member, and methods of use thereof.

BACKGROUND

In the oil and gas industry, production pipelines may be operated for several years until decommissioning. Over time, internal and external environmental conditions affect the structural integrity of the pipeline. Regular internal and external monitoring is often performed to maintain the integrity of the pipeline because, in part, failure of such pipelines may lead to content loss into the environment and pipeline shut-down which can then result in significant financial losses to the pipeline company and detrimental environmental losses. Thus, once a defect is identified on the pipeline, depending on the type and severity of the defect, a timely and suitable repair should be performed to allow resumption pipeline operation.

A major defect in the pipeline often requires a spool-piece type repair in which a defective portion of the pipeline is replaced with a repair tubular, often called a spool piece, which typically is a short segment of pipe that includes end connectors and flanges on each end of the spool piece and pipeline for inline coupling the spool piece with the pipeline.

One of the existing techniques includes using end connectors or clamps that provide sealing on the pipelines using elastomeric seals. Elastomeric seals provide advantages, such as less dependency of surface preparation, negligible corrosion rate, high chemical inertness and reusability. However, such connectors are not reliable under high temperature conditions. Thus, for high temperature and high-pressure conditions, connectors with metallic materials sealing are preferred because the metallic material sealing is reliable under high temperature and high-pressure conditions.

Existing connectors with metallic sealing include flareless fitting which does not require a flaring operation and are used on medium to heavy walled pipelines. One very common type of flareless fitting is a ferrule type fitting. In general, the ferrule type fitting is a three-piece assembly that includes nut, ferrule seal, and body. Flareless fitting works by forcing a ferrule edge into the tubing wall to create a seal. The resulting contact pressure at joining surface provides a leak proof sealing and resistance to vibration. Typically, the ferrule type fittings are assembled by pull-up turns, i.e., two fasteners or threaded components such as nut and body are tightened on the pipeline with one or more ferrules placed in-between the nut and body. As the nut and body are tightened, rotating the ferrules can provide penetration into the pipeline's outer diameter, thereby forming a seal on the pipeline between nut and the body. However, such a type of ferrule fittings is not applicable to larger diameter of pipelines, e.g., those up to 48 inches. For smaller diameter pipelines, the nut and body components are typically actuated by screw coupling; however, it is difficult to use screw coupling on large diameter pipeline due to high torque requirement. Moreover, specialized and customized tooling is often required for actuating a large diameter assembly which is not practically feasible. In addition, torquing heat is generated when a ferrule seal is rotated, further leading to metal-to-metal galling.

BRIEF DESCRIPTION OF THE DRAWINGS

Various figures are included herein which illustrate aspects of embodiments of the disclosed inventions.

DETAILED DESCRIPTION OF AN EXEMPLARY EMBODIMENT

Figure 1:
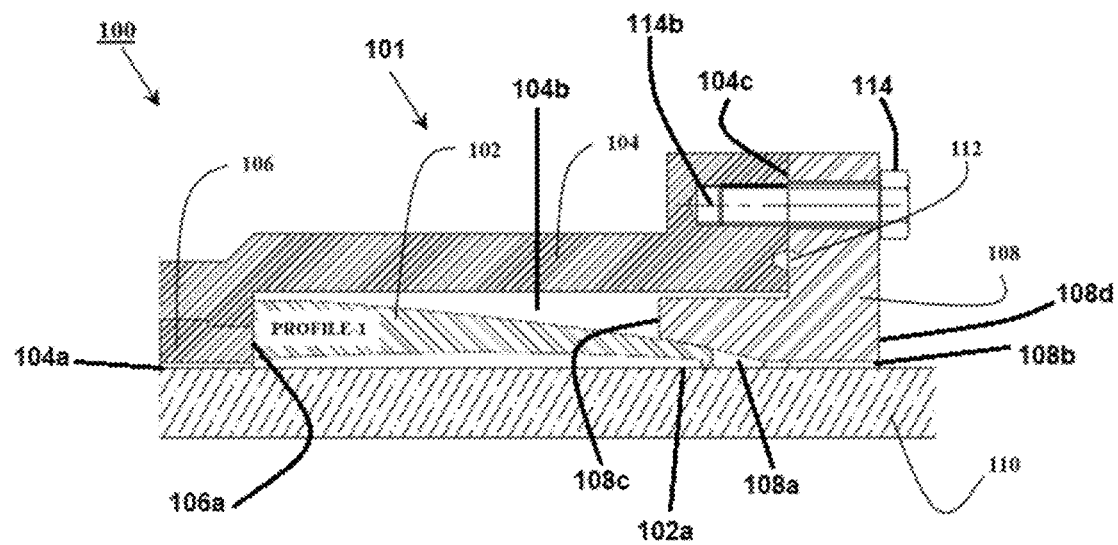
FIG. 1 illustrates schematic arrangement showing a seal in accordance with a first embodiment of a sealing member for repairing a pipeline.

Generally, a "controlled surface" as used herein comprises housing 104 (FIG. 1), stopper 106 (FIG. 1), and flange 108 (FIG. 1). Typically, housing 104, stopper 106, and flange 108 are machined components whose properties, such as but not limited to surface finish, hardness and toughness, are controlled by a user. In the similar manner, an "uncontrolled surface" as used herein is an outer surface of an underwater tubular such as pipeline 110 (FIG. 1) on which the seal assembly 100,706A,706B (FIGS. 1 and 7) rests. A "pipeline" as used herein may be, but is not limited to, a tubular per API 5L standard of American Petroleum Institute as of 2021 and may comprise a seamless steel pipeline and welded steel pipeline with a diameter of up to around 48 inches. In general, it is difficult to provide a proper surface finish to an external surface of pipeline 110 and pipelines generally have external surfaces that vary with a least material condition (LMC) and a maximum material condition (MMC).

Generally, all the profiles of seal 102 (e.g., FIGS. 1-3) are energized or actuated in the same or a similar manner, e.g., seal 102 may be actuated or energized by axially compressing seal 102 between controlled and uncontrolled surfaces. Seal 102 may comprise a nickel-copper alloy (about 67% Ni-23% Cu), ASTM-B-16 Alloy 360, ASTM-B-124 Alloy 377, or, preferably, ASTM-B-164 for penetrating seal 102 into pipeline 110. Moreover, seal 102 may comprise composite materials such as material deposition by welding, bolting, and the like, or a combination thereof at sealing contacts on the base material. Generally, usage of softer material at a sealing contact improves sealing efficiency against microscopic and macroscopic asperities and lowers the loads required for energization.

In addition, seal 102 contact surfaces are typically silver coated for improving the sealing efficiency against microscopic asperities or any minor ovality in the external surface of uncontrolled surface 110 (FIG. 1). In embodiments, the thickness of the silver coating is typically between 5-15 μm (0.2-0.6 mil). However, generally, all profiles of seal 102 can use one or more seals with different internal diameters which could be used selectively based on the as-built pipe outer diameter (OD). This enables the seal profiles to cover a larger tolerance range of API Spec 5L pipe OD.

In various embodiments, a buckling wrinkle hampers 360° contact of seal 102 (FIG. 1) with uncontrolled surface 110 (FIG. 1), resulting in gaps between uncontrolled 110 surface and seal 102 which act as leakage path for fluid.

Referring now to FIG. 1, in a first embodiment seal assembly 100, which is disposable about uncontrolled surface 110, e.g., an exterior of pipeline 110, typically comprises controlled surface 101, housing seal 112 disposed intermediate housing 104 and end flange 108; and one or more seals 102 disposed at least partially within housing 104 and adapted to be selectively in communication with uncontrolled surface 110.

In an embodiment, controlled surface 101 comprises housing 104, which comprises fluid inlet 104a and interior 104b; one or more stoppers 106 disposed about or within interior 104b where stopper 106 comprises interior end 106a exposed to interior 104b; and end flange 108 which is disposed proximate first end 104c of housing 104 and, in embodiments, fixed to housing 104 with one or more fasteners 114.

End flange 108 typically comprises flange tapered edge 108a, angled towards interior 104b of housing 104, fluid outlet 108b, interior end 108c, and exterior end 108d disposed distally from interior end 108c. End flange 108 is typically selectively fixed to housing 104 such as by using one or more fasteners 114, which can be a threaded bolt where housing 104 comprises a complementarily threaded bolt receiver 114b to securely receive the bolt.

Figure 4:
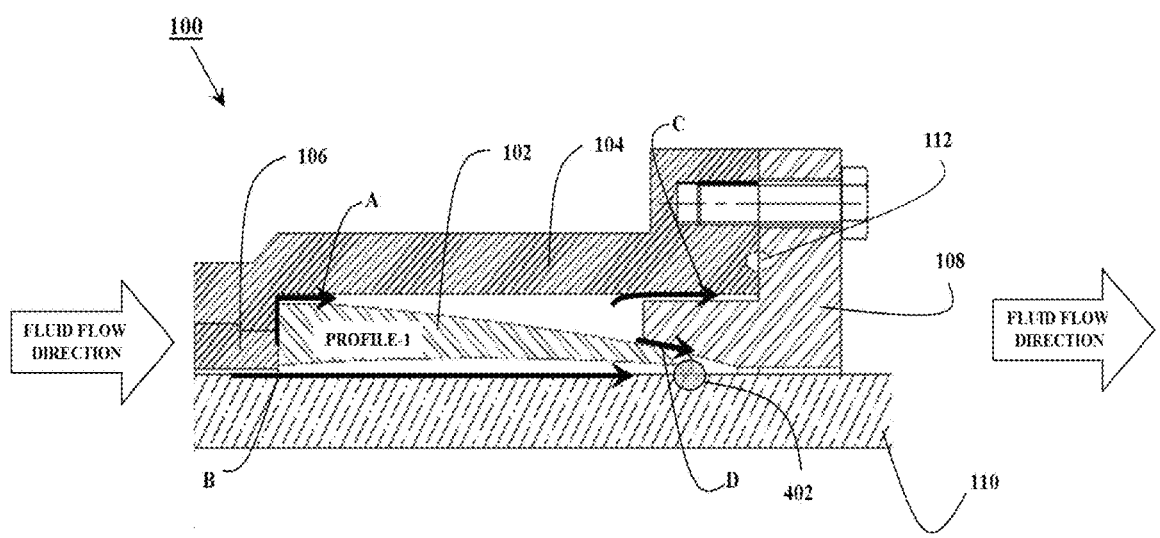
FIG. 4 illustrates a seal of first embodiment showing leakage paths.

Seal 102 typically comprises at least one seal tapered edge 102a in contact with, and configured to cooperatively complement, flange tapered edge 108a. As discussed more fully below, seal 102 selectively allows or blocks fluid flow such as between fluid inlet 104a and fluid outlet 108b as well as selectively blocks fluid flow at one or more predefined set of fluid leakage paths as variously described below, e.g., fluid leakage paths A,B,C,D (FIG. 4). As illustrated herein, in embodiments the direction of fluid flow is from fluid inlet 104a to fluid outlet 108b and illustrated this way to explain fluid the various leakage paths. However, direction of fluid flow must not be taken as limiting the scope of the claimed inventions as the direction of fluid flow may also be from fluid outlet 108b to fluid inlet 104a.

In embodiments, housing seal 112 comprises a metal which can comprise stainless steel, austenitic stainless steel, ferritic stainless steel, duplex stainless 50 steel, a nickel alloy, or precipitation hardened stainless steel, or the like, or a combination thereof. In certain embodiments, housing seal 112 comprises a ring type joint (RTJ) gasket, a C-Shaped sealing gasket, or the like.

Figure 2:
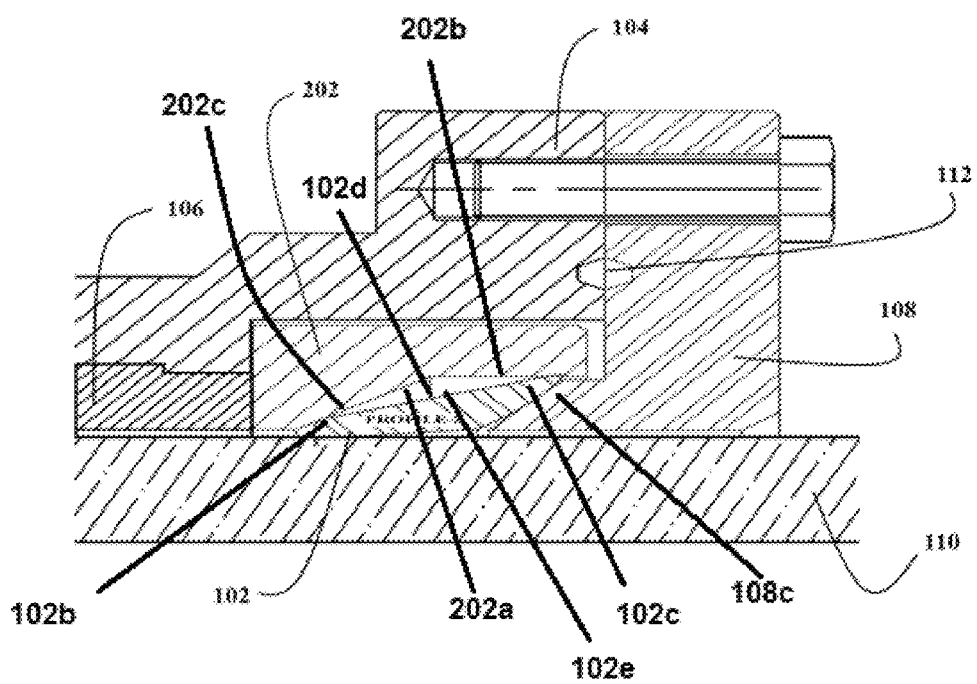
FIG. 2 illustrates schematic arrangement showing a seal of a second embodiment of a sealing member for repairing a pipeline.

Referring now additionally to FIG. 2, in an embodiment controlled surface 101 (FIG. 1) comprises one or more wedge blocks 202 disposed about or within interior 104b (FIG. 1) of housing 104. At least one wedge block 202 is typically in, or selectively in, communication with housing 104, stopper 106, and end flange 108. Each wedge block 202 typically comprises at least one wedge block tapered edge 202a which is at least partially in communication with seal 102 at first edge 102b of seal tapered edge 102a (FIG. 1) and in communication with second portion 102c (FIG. 2) of seal tapered edge 102a.

In certain embodiments, wedge block tapered edge 202a comprises first wedge block tapered edge 202b oriented towards end flange 108 and offset at an angle from second wedge block tapered edge 202c which is oriented distally from end flange 108. In these embodiments, first wedge block tapered edge 202b and second wedge block tapered edge 202c define conical seal guide 102e with respect to a flange tapered surface at interior end 108c. In these embodiments as well, seal 102 typically comprises sloped side 102d disposed towards interior 104b (FIG. 1) of housing 104, where sloped side 102d is typically only partially in communication with first wedge block tapered edge 202b and second wedge block tapered edge 202c.

Figure 3:
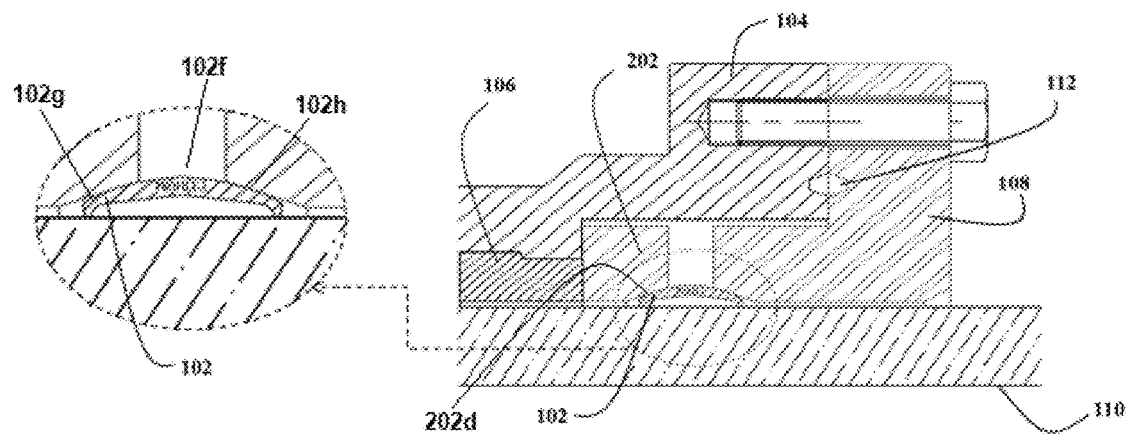
FIG. 3, illustrates a schematic arrangement showing a seal of a third embodiment of a sealing member for repairing a pipeline.

Referring now additionally to FIG. 3, in embodiments controlled surface 101 (FIG. 1) comprises one or more wedge blocks 202 disposed about or at least partially within interior 104b of housing 104, where at least one wedge block 202 is in communication with housing 104 and stopper 106. In these embodiments, wedge block 202 is typically distanced apart from end flange 108 and may be selectively moved towards and/or away from end flange 108. In these embodiments, wedge block 202 typically comprises wedge block tapered edge 202d at least partially in communication with seal 102 and seal 102 comprises a substantially convex surface 102f, the apex of which is disposed towards interior 104b of housing 104; first edge 102g, which is in communication with wedge block tapered edge 202d; and second edge 102h which is in communication with flange tapered edge 108a (FIG. 1). In these embodiments, seal 102 allows or blocks fluid flow from first edge 102g over convex surface 102f to second edge 102h.

Figure 7:
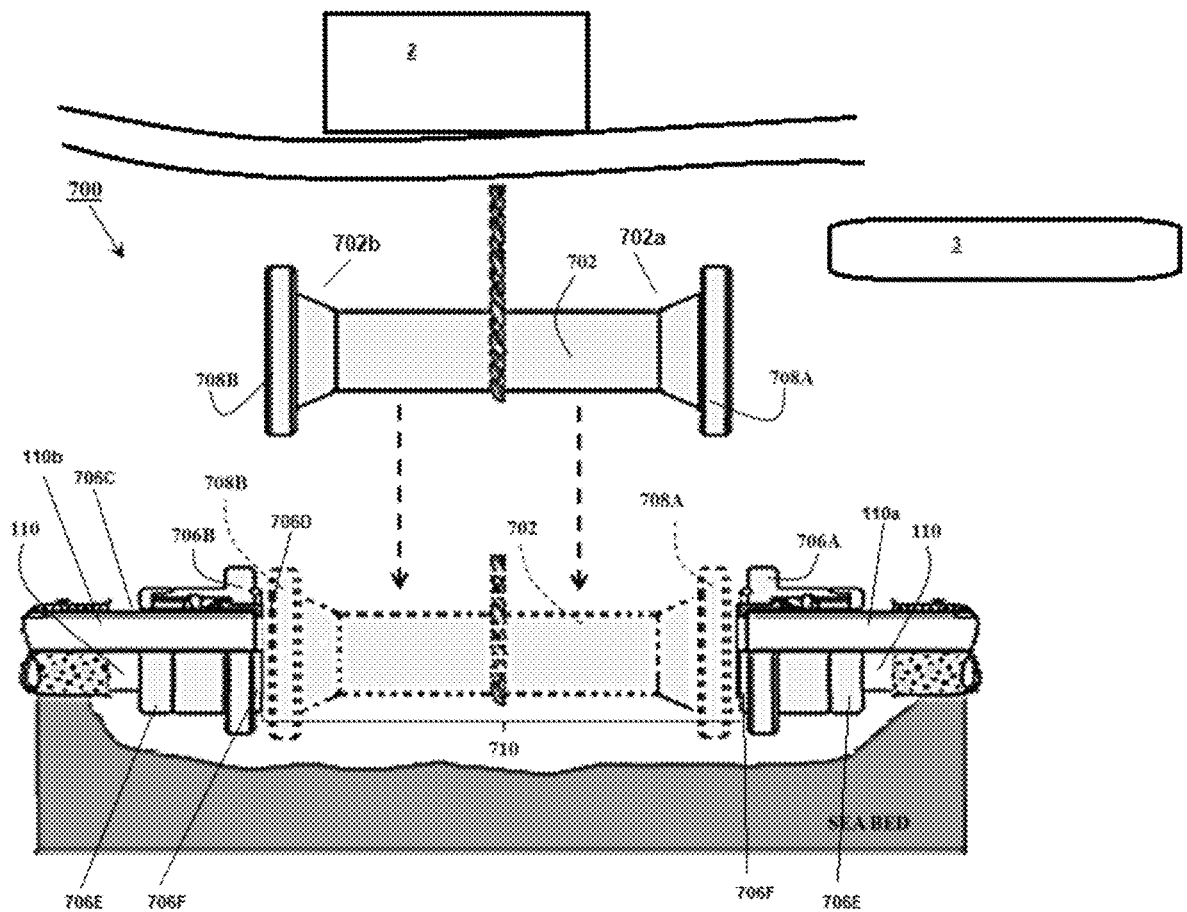
FIG. 7 illustrates a subsea environment depicting a first embodiment of an apparatus for repairing a pipeline.

Referring now to FIG. 7, which illustrates a subsea environment repair system, one or more seal assemblies 100 (FIG. 1) may be used as a component of a spool piece, e.g., spool assembly 700. Spool assembly 700 comprises substantially tubular conduit 702, e.g., a spool piece, comprising first conduit end 702a and second conduit end 702b; two flanges 708A, 708B, which may be may be weld neck flanges, which are disposed at corresponding ends 702a, 702b of substantially tubular conduit 702; and two seal assemblies 706A, 706B, each seal assembly 706A, 706B configured to mate with a corresponding flange 708A,708B of the two flanges 708A, 708B.

In embodiments, each seal assembly 706A, 706B, which is similar to and typically is an embodiment of seal assembly 100 (FIG. 1) as described above, comprises housing 104 (FIG. 1) comprising an inner annulus adapted to fit over an outer surface of pipeline 110; first housing end 706E, fluid inlet 706C disposed proximate first housing end 706E; second housing end 706F; and fluid outlet 706D disposed proximate second housing end 706F. In embodiments, each seal assembly 706A, 706B further comprise groove 912 (FIG. 9) disposed within interior 104b (FIG. 1) of housing 104 intermediate first housing end 706E and second housing end 706F; stopper 106 (FIG. 1) movably or slidingly disposed in groove 912 where stopper 106 comprises interior end 106a (FIG. 1) exposed to interior 104b (FIG. 1); end flange 108 (FIG. 1) disposed at first end 706E and fixed to housing 104; housing seal 112 (FIG. 1) disposed intermediate housing 104 and end flange 108, and seal 102 (FIG. 1) disposed within housing 104 and in physical contact with interior end 106a of stopper 106 where seal 102 is also adapted to be in communication with uncontrolled surface 110, e.g., a pipeline. As in other embodiments described above, seal 102 may comprise seal tapered edge 102a (FIG. 1) in contact with and configured to cooperatively complement flange tapered edge 108a (FIG. 1) to allow or block fluid flow between fluid inlet 104a (FIG. 1) and fluid outlet 108b (FIG. 1) and selectively blocking fluid flow at a predefined set of fluid leakage paths.

End flange 108 (FIG. 1) is configured to mate its seal assembly 706A with a corresponding flange 708A,708B. In embodiments, end flange 108 comprises flange tapered edge 108a (FIG. 1) angled towards interior 104b (FIG. 1) of housing 104 (FIG. 1) and fluid outlet 108b (FIG. 1). End flange 108 comprises interior end 108c (FIG. 1) and exterior end 108d (FIG. 1) disposed distally from interior end 108c.

Figure 8:
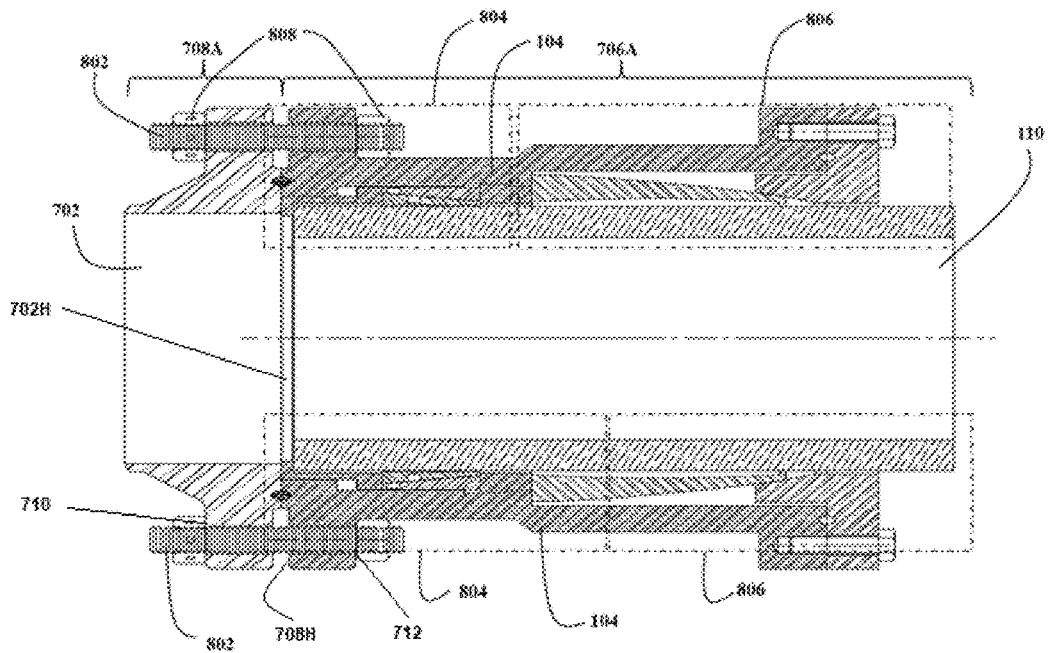
FIG. 8 illustrates a longitudinal cross section of a spool flange with an end connector without a test port.

In certain embodiments, referring additionally to FIG. 8, each seal assembly of seal assemblies 706A,706B comprises a corresponding predetermined set of stud holes and spool assembly 700 comprises a corresponding set of couplers 802,808 (FIG. 11A) configured to fit within the stud holes, e.g. 710 (FIG. 8), to fasten end flanges 108 to their corresponding seal assemblies 706A,706B. Typically, couplers 802,808 comprise one or more studs 802, each comprising a threaded end, and a corresponding number of fastening nuts 808 configured to be accepted onto the threaded end. In other embodiments, couplers 802,808 comprise one or more studs 802 comprising a threaded end and a corresponding number of complementarily threaded stud receivers in housing 104 (FIG. 1), e.g., threaded bolt receiver 114b (FIG. 1).

Figure 9:
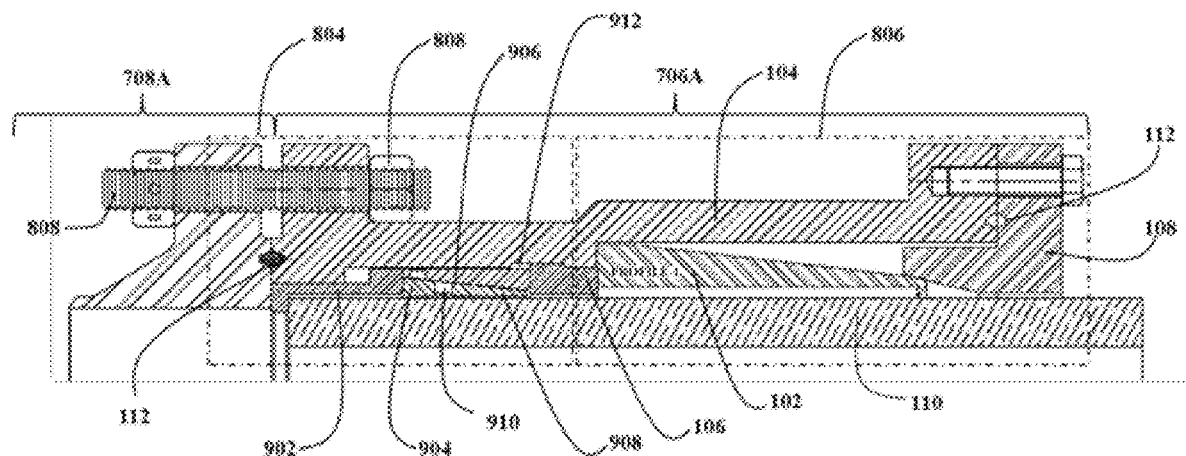
FIG. 9 illustrates a longitudinal cross section of a front section and a rear section of the end connector of FIG. 8.

Referring additionally now to FIG. 9, in certain embodiments seal assemblies 706A,706B comprise machined slip anchor 904 and machined slip cone 906. Slip anchor 904 is operatively connected to or in communication with stopper 106 and typically comprises griping surface 908 which is configured to grip onto uncontrolled surface 110 and which, in turn, typically comprises a predetermined set of teeth. Slip anchor 904 and slip cone 906 typically comprise a complementary geometry that allows slip anchor 904 and slip cone 906 to slip over each other, e.g., the complementary geometry typically comprises a set of complementary wedged shaped portions.

In these embodiments, one or more pins 910 may be present and disposed intermediate slip anchor 904 and slip cone 906. Pin 910 forms a deformable but substantially rigid connection disposed in-between slip anchor 904 and slip cone 906 and is aligned to guide slip cone 906 as it moves or slides with movement of slip anchor 904. Pin 910 also comprises a material that allows it to be sheared away due to a force acting on pin 910 when the force exceeds a predetermined shear strength of pin 910. Pin 910 may comprise a soft metallic material such as, but not limited to, brass, copper, or bronze.

As noted above, seal assemblies 706A,706B may further comprise groove 912 within interior 104b (FIG. 1) of housing 104 where groove 912 is disposed intermediate first housing end 706E and second housing end 706F. If groove 912 is present, stopper 106 is typically slidingly disposed in the 912, e.g., stopper 106 may comprise piston 902 slidingly disposed within housing 104. In most embodiments, pin 910 disallows sliding of slip anchor 904 until pin 910 is shorn and allows slip anchor 904 to move or slide relative to slip cone 906, and, if present, piston 902 to continue to move into housing 104 once pin 901 is shorn.

Figure 11A:
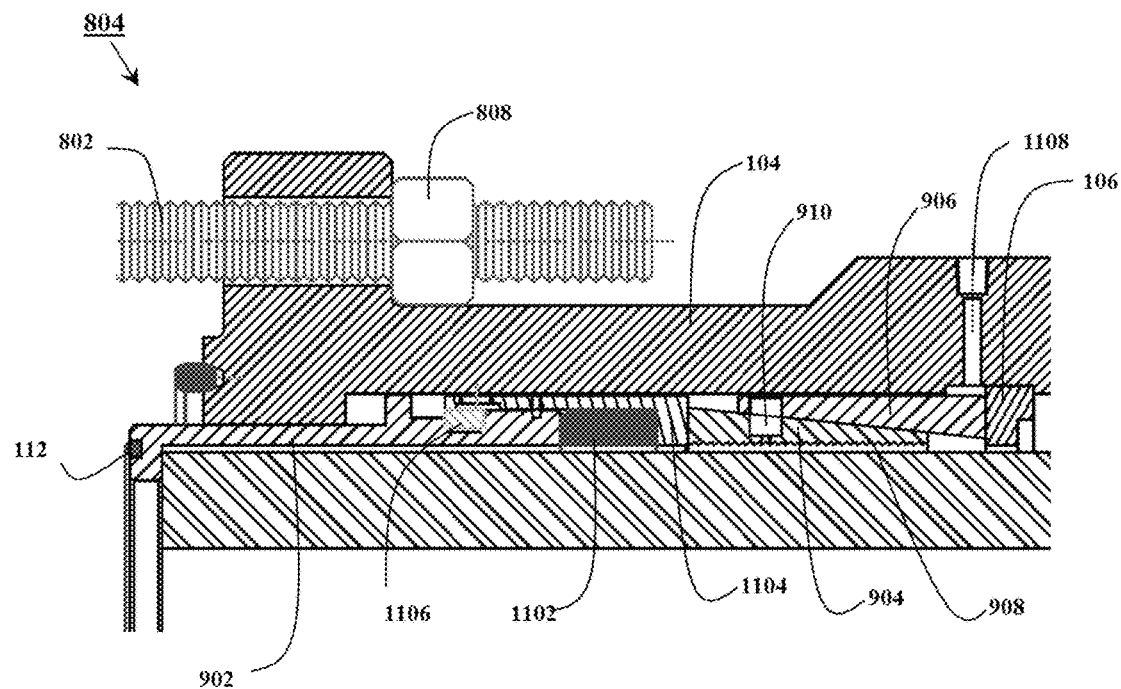
FIG. 11A illustrates a longitudinal cross section of the front section of the end connector of FIG. 10
Figure 11B:
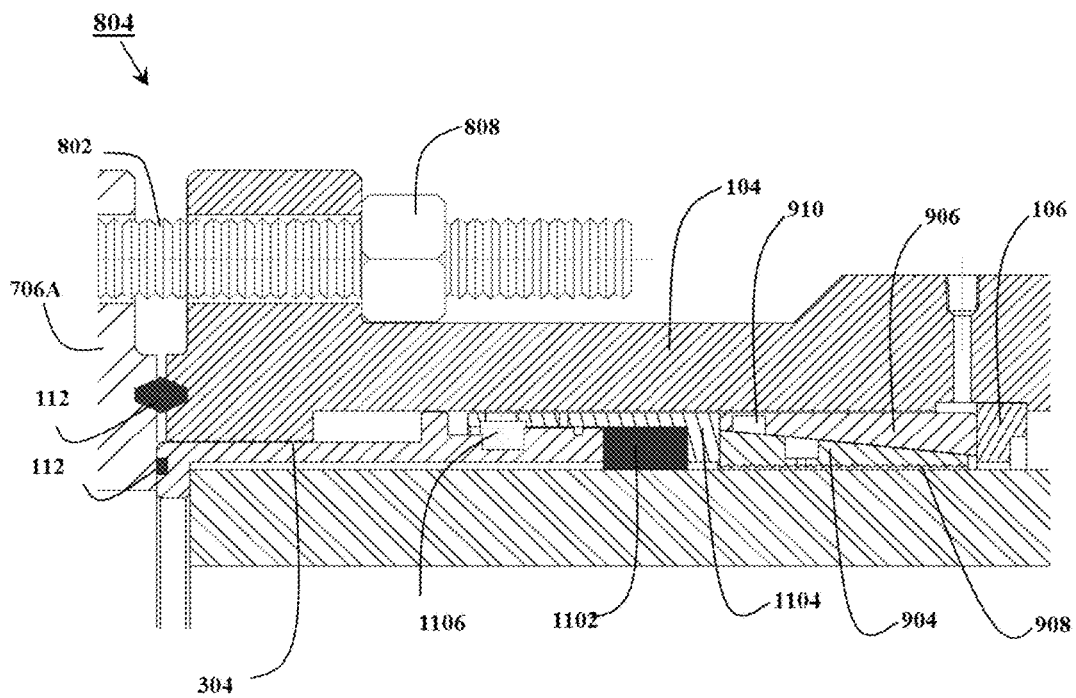
FIG. 11B illustrates the longitudinal cross section when fastening nuts are at a completely tensioned position.

Referring now to FIGS. 11A and 11B, in embodiments where stopper 106 comprises piston 902 (FIG. 9) movably or slidingly disposed within housing 104, seal assemblies 706A,706B may further comprise piston end cap 1104 disposed within interior 104b (FIG. 1), secondary sealing member 1102 disposed between piston 902 and first piston end cap 1104, piston locking ring 1106 which is configured to arrest relative movement between piston 902 and piston end cap 1104, and one or more test ports 1108 extending from interior 104b (FIG. 1) of housing 104 to an outer surface of housing 104. Secondary sealing member 1102 may comprise an elastomeric seal and generally acts as a test seal for testing pressure between seal 102 and secondary sealing member 1102.

Figure 12:
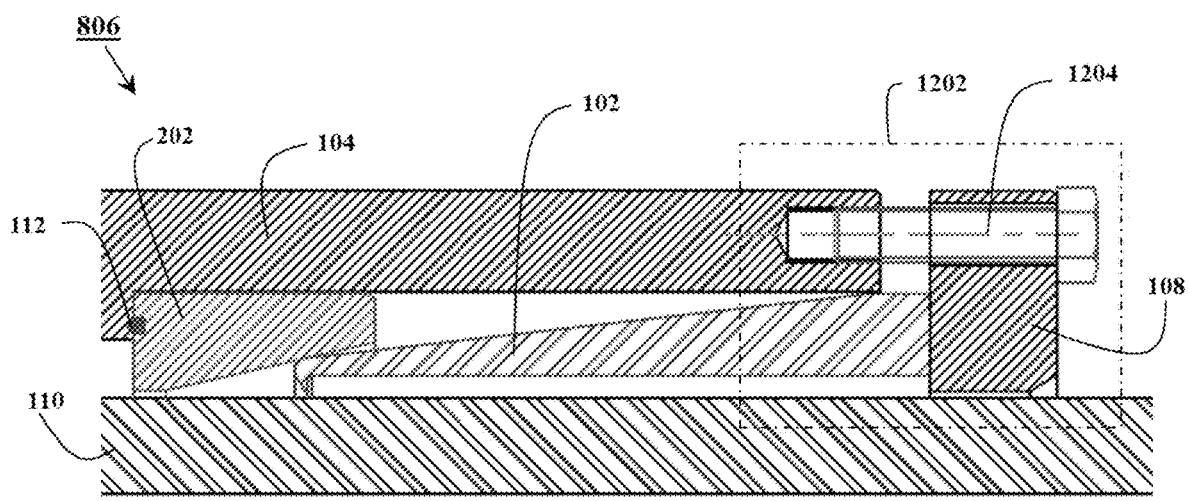
FIG. 12 illustrates a longitudinal cross section of the rear section of the end connector of FIG. 10.

Referring additionally to FIG. 12, seal assembly 706A, 706B may further comprise rear section 806 in which seal 102 is located, where rear section 806 comprises seal actuator 1202, comprising an end flange actuator, described below, that axially pushes or moves end flange 108 towards housing 104 and wedge block 202 which is of a sufficient hardiness such that wedge block 202 does not deform when subjected to axial force by seal actuator 1202. The end flange actuator may comprise a plurality of bolts 1204 insertable from end flange 108 into housing 104 such as into bolt receivers 114b (FIG. 1).

Figure 16:
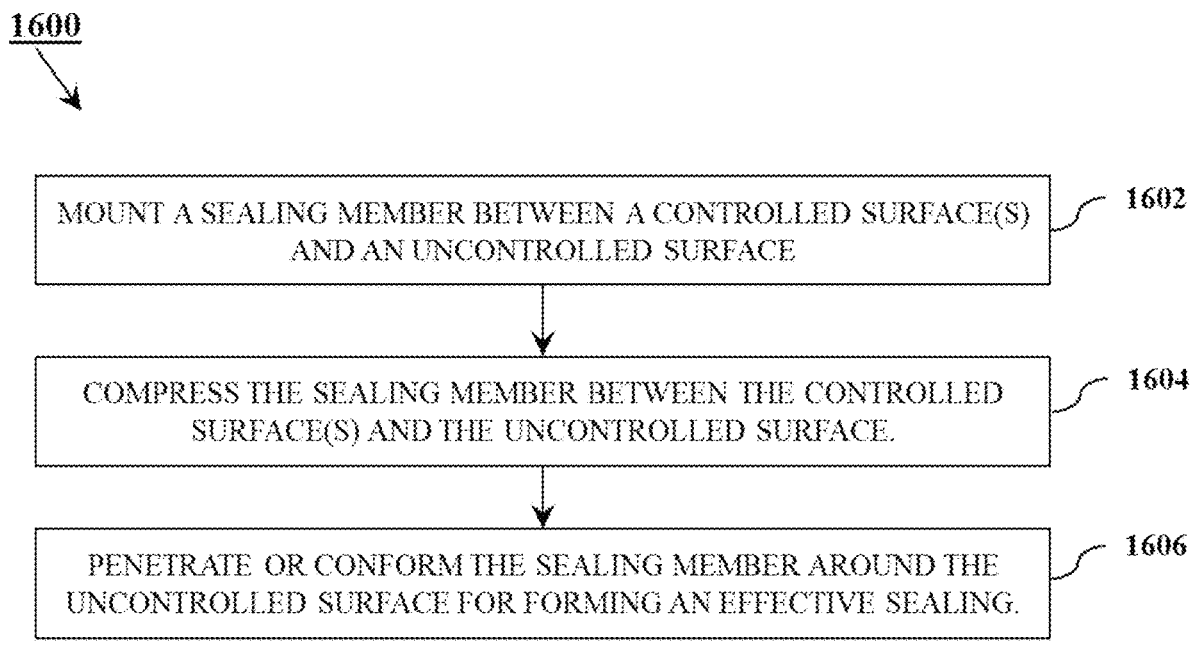
FIG. 16 illustrates a method of actuating a seal.

In the operation of exemplary embodiments, referring back generally to FIGS. 1-6 and to FIG. 16, seal assembly 100 may be applied to uncontrolled surface 110, where seal assembly 100 is as described in its various embodiments above, by disposing seal assembly 100 onto or about uncontrolled surface 110 such that controlled surface 101 is disposed proximate uncontrolled surface 110, e.g., proximate an outer surface of uncontrolled surface 110 such as pipeline 110; securing seal 102 to uncontrolled surface 110; activating seal 102 between controlled surface 101 and uncontrolled surface 110; and using activated seal assembly 100 to block fluid flow between a predetermined set of leakage paths as described below.

In embodiments, generally shown at 1600 (FIG. 16), activating seal assembly 100 comprises axially compressing seal assembly 100 between controlled surface 101 and uncontrolled surface 110. This may be accomplished by pressurizing seal assembly 100 between controlled surface 101 and uncontrolled surface 110. Generally, as used herein, "compress" includes moving two or more components of seal assembly 100 together, e.g., housing 104 and end flange 108. This, in turn, can compress seal 102.

In embodiments, securing seal assembly 100 to uncontrolled surface 110 may comprise penetrating an outer surface of uncontrolled surface 110 with a predetermined portion of seal assembly 100. In certain embodiments this may include using seal 102 that comprises a hardness that is less than a hardness of uncontrolled surface 110; deforming seal 102; and conforming seal 102 to the outer surface of uncontrolled surface 110.

In embodiments, disposing seal assembly 100 between controlled surface 101 and uncontrolled surface 110 comprises deploying seal assembly 100 about an outer surface of uncontrolled surface 110 and securing seal assembly 100 to uncontrolled surface 110 by energizing seal assembly 100 such as by axially compressing seal 102 between controlled surface 101 and uncontrolled surface 110.

In embodiments where seal tapered edge 102a further comprises a conical and/or pointed end 402 (FIG. 4), seal 102 may be compressed axially between stopper 106 and end flange 108 by the methods described herein; conical pointed end 402 pushed along flange tapered edge 108a towards exterior end 108d of end flange 108; and seal 102 deformed radially inwards towards interior 104b of housing 104. Deforming seal 102 radially inwards towards interior 104b of housing 104 may comprise bending and pushing seal 102 radially inwards. If controlled surface 101 further comprises wedge block 202 (FIG. 2) disposed about interior 104b of housing 104 proximate interior end 106a of stopper 106, deforming seal 102 radially inwards towards interior 104b of housing 104 may occur as a result of reaction forces from wedge block 202 moving conical pointed end 402 radially inwards towards an external surface of uncontrolled surface 110.

Figure 14A:
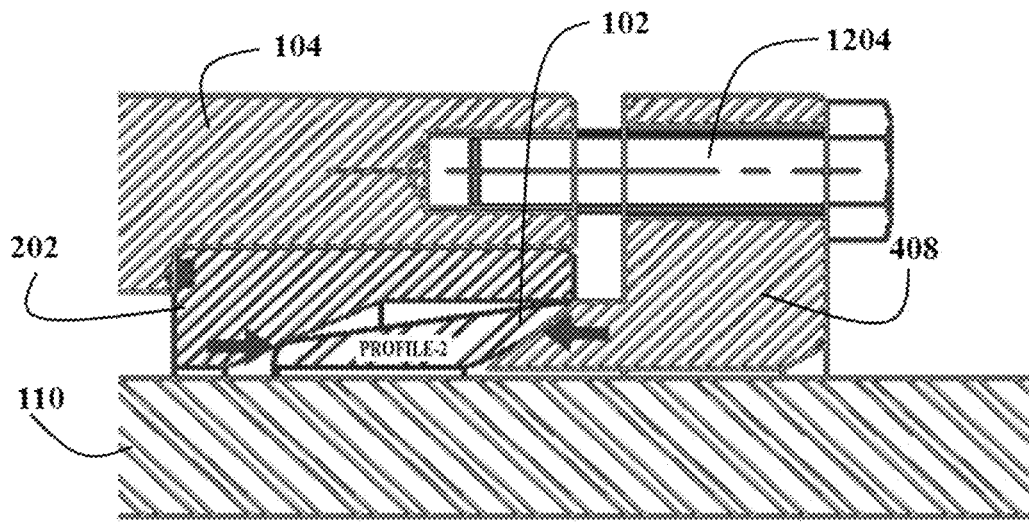
FIG. 14A illustrates a sectional view of the second embodiment of the seal in an end connector with a test port, in non-energized condition.
Figure 14B:
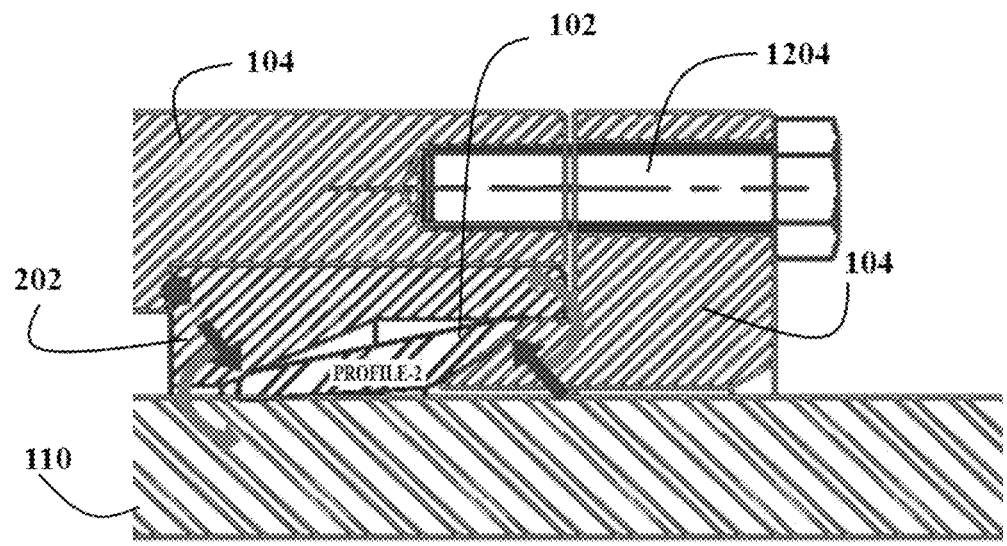
FIG. 14B illustrates the sectional view in an energized condition.

In embodiments, seal tapered edge 102a may comprise one or more conical and/or pointed ends, e.g., protrusions or teeth or bumps, on an inner diameter side and/or outer diameter side of seal 102 to create multiple sealing contacts with the interfaces acting as contingent sealing contacts.

Where wedge block 202 further comprises wedge block tapered edge 202a (FIG. 2) at least partially in communication with seal 102, activating seal 102 may further comprise applying a twisting movement within seal 102. Referring additionally to FIG. 14A and FIG. 14B, which illustrate a sectional view of an embodiment of seal 102 disposed in an embodiment of end connector 706A with test port 1108, in a non-energized condition and an energized condition correspondingly, fasteners 1204 are tightened and, as tightened, apply axial force on end flange 108 to move it towards seal 102. The acting axial force generates a reaction force acting on seal 102, creating a twisting movement to push seal 102 radially inwards towards interior 104b due to a reaction force from wedge block 202, and allowing the twisting movement to push seal 102 radially outwards due to wedging action from end flange 108. In embodiments, seal 102 is guided at both ends by two conical reaction surfaces provided by wedge block 202 and tapered surface of end flange 108.

In certain embodiments described above, seal 102 is guided at both ends by two conical reaction surfaces which are provided by wedge block 202 and tapered surface 108a of end flange 108. The resultant forces generate twisting moment in seal 102 which pushes seal 102 radially inwards because of a reaction force generated by wedge block 202 and radially outwards because of wedging action from end flange 108, as illustrated in FIG. 14B. In this manner, seal 102 is in contact with uncontrolled surface 110 and either penetrates or conforms around an external surface of uncontrolled surface 110, depending upon the hardness of seal 102, to form one or more leak proof passages.

Where uncontrolled surface 110 comprises a pipeline, in embodiments the material of seal 102 may be harder than that of the material of pipeline 110 and blocking the predetermined set of leakage paths further comprises sealing a predetermined set of leakage paths in pipeline 110 by penetrating seal 102 into, and/or deforming the seal 102 to conform to, an outer surface of pipeline 110, as more fully explained below.

Referring now to FIG. 4, in embodiments where uncontrolled surface 110 comprises pipeline 110 and housing seal 112 comprises a metal, a pressure containment or pressure boundary may be created at a plurality of leakage paths, e.g., leakage paths A-D, by using seal 102 to create a blockage of first leakage path D of the plurality of leakage paths to create pressure containment by penetrating or conforming seal 102 at seal tapered edge 102a (FIG. 1); creating a blockage of second leakage path C of the plurality of leakage paths between seal 102 and tapered edge 108a (FIG. 1) of end flange 108 and using housing seal 112, which may comprise a metal, to block second leakage path C; and blocking third leakage path B of the plurality of leakage paths at seal tapered edge 102a. As illustrated in FIG. 4, leakage path A is not blocked and is an open fluid flow path; leakage path B is blocked due to penetrating or conforming of seal 102, at nose 402 (FIG. 4); leakage path D is blocked by seal 102 by creating a blockage between seal 102 and tapered edge 108a of flange 108; and leakage path C is blocked using seal 112 between housing 104 and flange 108. As leakage paths B, C, and D are blocked, pressure containment is created by seal 102.

Figure 5:
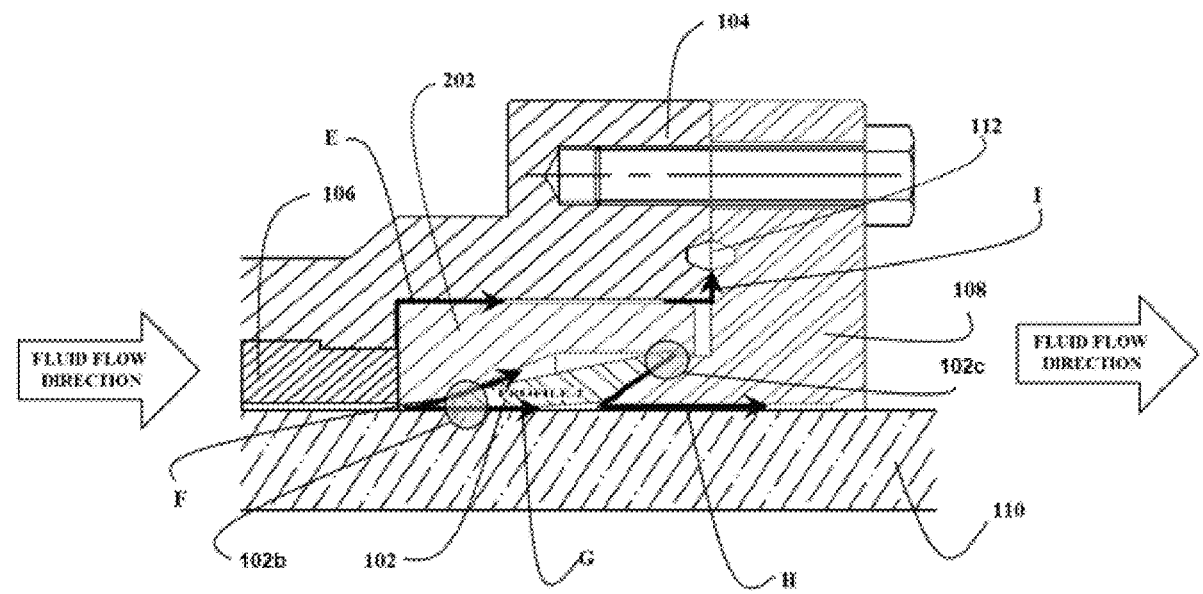
FIG. 5 illustrates the seal of the second embodiment showing leakage paths.

Referring now to FIG. 5, in embodiments where controlled surface 101 is as described above comprising wedge block 202, which comprises wedge block tapered edge 202a (FIG. 2) at least partially in communication with the seal 102 and disposed about or at least partially within interior 104b (FIG. 1) of housing 104 and in communication with housing 104, stopper 106, end flange 108, housing seal 112, which typically comprises a metal, and uncontrolled surface 110, a pressure containment or pressure boundary may be created with respect to uncontrolled surface 110, e.g., pipeline 110, at a plurality of leakage paths by energizing seal 102 at first edge 102b (FIG. 2) to create an axial compression of seal 102, such as by twisting seal 102, to create a sealing at first edge 102b proximate wedge block tapered edge 202a and at second edge 102c (FIG. 2) proximate interior end 108c (FIG. 2) at first leakage path F of the plurality of leakage paths; forming a seal at first edge 102b between tapered edge 202a (FIG. 2) of wedge block 202 and an external surface of pipeline 110 at second leakage path G of the plurality of leakage paths; forming a seal at second edge 102c between a flat edge of wedge block 202 and interior end 108c of end flange 108 and using housing seal 112 to block leakage path at third leakage path I of the plurality of leakage paths; blocking leakage path H by second edge 102c; and leaving fifth leakage path E of the plurality of leakage paths unblocked. In this manner, four out of five leakage paths, i.e., leakage path F, leakage path G, leakage path H, and leakage path I, are blocked, leaving leakage path E unblocked and creating pressure containment by seal 102.

Figure 6:
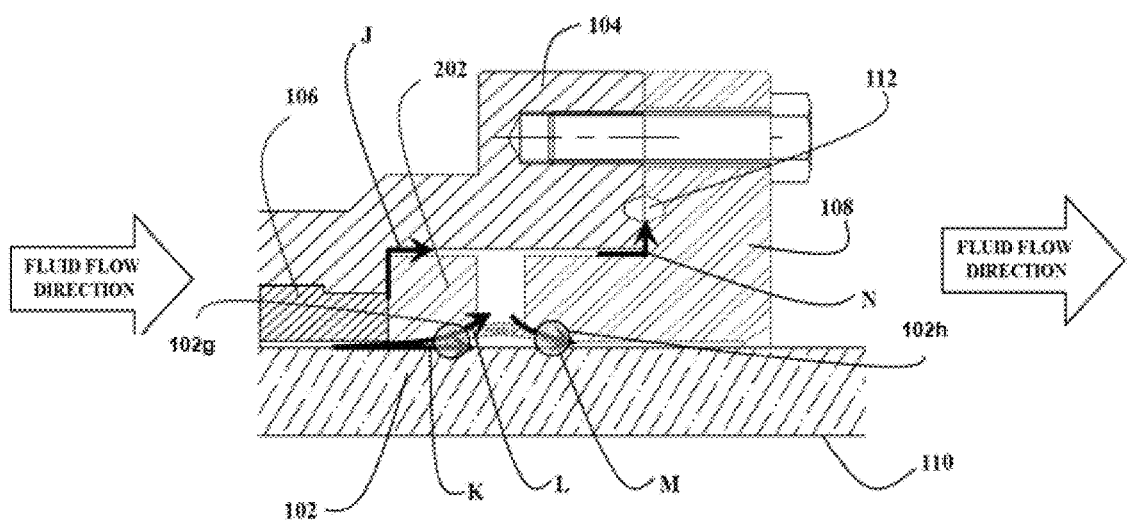
FIG. 6 illustrates the seal of the third embodiment showing leakage paths of a sealing member for repairing a pipeline.

Referring now to FIG. 6, in an embodiment where controlled surface 101 further comprises wedge block 202, comprising wedge block tapered edge 202d (FIG. 3) at least partially in communication with seal 102, is disposed about or at least partially within interior 104b (FIG. 1) of housing 104 and in communication with interior 104b of housing 104, stopper 106, and uncontrolled surface 110, seal 102 comprises a substantially convex surface 102f (FIG. 3) which is disposed towards interior 104b of housing 104 and which is in communication with wedge block tapered edge 202*d* and second edge 102*g* (FIG. 1) in communication with flange tapered edge 108*a*, and where seal 102 selectively allows fluid flow from first edge 102*f* over convex surface 102*f* to second edge 102*g*, and housing seal 112 (FIG. 1) which typically comprises a metal, and where uncontrolled surface 110 comprises a pipeline 110, a pressure containment or pressure boundary may be created at a plurality of leakage paths by energizing seal 102 to create a seal at first edge 102*g* (FIG. 3) and at second edge 102*h* (FIG. 3) by axially compressing seal 102 to block leakage path L; forming a seal at first edge 102*g* between tapered edge 202*d* (FIG. 3) of wedge block 202 and an external surface of pipeline 110 to block second leakage path K; forming a seal at second edge 102*g* between tapered edge 108*a* (FIG. 1) of end flange 108 and the external surface of pipeline 110 to block third leakage path M; using housing seal 112 to block fourth leakage path N; and leaving fifth leakage path J of the plurality of leakage paths unblocked.

Referring again generally to FIGS. 7-15, as described above seal assembly 100 (FIG. 1) may be used in smart flanges, clamps, connectors or similar devices such as those used for repairing flowlines or pipelines either subsea or in other petrochemical industries. These pipelines/flowlines are typically operated at high temperature and under high pressure.

In various embodiments, spool assembly 700 (FIG. 7) may be used to repair pipeline 110 (FIG. 7), where spool assembly 700 is as described above. Typically, referring generally back to FIG. 7, a predetermined set of flanges, e.g., two flanges 708A, 708B, are attached to substantially tubular conduit 702, one at each end of substantially tubular conduit 702; substantially tubular conduit 702 with its predetermined set of flanges 708A, 708B is positioned proximate a damaged portion of pipeline 110, e.g., proximate an open pipeline area 710 or a damaged area of pipeline 110 to be opened; and two seal assemblies 706A, 706B are deploying to a location proximate the open pipeline area 710.

If the damaged area has not been removed, it is removed to create open pipeline area 710 between first pipeline section 110*a* and second pipeline section 110*b* where second pipeline section 110*b* is separated from first pipeline section 110*a* at a distance defining open pipeline area 710. This can occur by cutting both sides of a damaged area of pipeline 110 and removing the cut damaged portion from pipeline 110 to create open area 710.

First seal assembly 706A is secured onto an open end of first pipeline section 110*a* proximate the pipeline open area and second seal assembly 706B is secured onto an open end of second pipeline section 110*b* proximate pipeline open area 710, each typically by slipping one seal assembly of seal assemblies 706A, 706B onto an end of the remaining, undamaged portion of pipeline 110. As discussed below, seal assemblies 706A, 706B may be one of two types, i.e., seal assembly 706A, 706B without test port 1108 (FIG. 11A) and seal assembly 706A, 706B with test port test port 1108. Generally, the method of coupling an end connector as described below is same for each type of seal assembly 706A, 706B, e.g., predetermined set of flanges 708A, 708B coupled to corresponding set of seal assemblies 706A, 706B Substantially tubular conduit 702 with its predetermined set of flanges 708A, 708B is typically aligned with a longitudinal axis of pipeline 110 that extends from first pipeline section 110*a* through open pipeline area 710 on through second pipeline section 110*b* and substantially tubular conduit 702 secured intermediate the two separate portions of the pipeline 110, e.g., by rigidly securing seal assemblies 706A,706B to pipeline sections 110*a*,110*b* and then coupling the predetermined set of flanges 708A, 708B to corresponding seal assemblies 706A,706B, typically by securing first flange 708A to its corresponding first seal assembly 706A and securing second flange 708B to its corresponding second seal assembly 706B, in no specific order. In certain embodiments, securing first flange 708A and/or second flange 708B to its corresponding seal assembly 706A,706B comprises a gripping operation by which seal assemblies 706A, 706B grip an outer surface of pipeline 110 and a sealing operation by which seal assemblies 706A, 706B seal the outer surface of pipeline 110 from fluid flows, as described herein. Generally, depending on type of seal assembly 706A,706B, i.e., with or without test port 1108 (FIG. 11A), a gripping operation is performed first and then a sealing operation is performed. However, in an embodiment both operations are performed at substantially the same time. In embodiments, gripping and sealing operations could be performed in any sequence and operated independently using an additional energization mechanism which does not require use of studs 802 and nuts 808 to perform either of the operations. This improves the overall efficiency of operations by providing any fine tuning or setting required which may be required to set the grips and seals during installation and/or operation. In addition, an alternate construction of connector 706A,706B could be used to perform gripping operation in rear portion 806 and sealing operation in front portion 804. This type of construction prevents exposure of fluids being carried in pipeline with grip 904.

Still referring generally to FIG. 7, spool assembly 700 may be suspended from topside vessel 2 and orientation of substantially tubular conduit 702 controlled either through topside vessel 2 or via remotely operated vehicle (ROV) 3, or both, by aligning an axis of each flange 708A, 708B with an axis of its corresponding seal assembly 706A, 706B. A diver (not shown in the figures) or remotely operated vehicle (ROV) 3 may be used to manually align spool assembly 700 with pipeline 110.

After aligning the axis of each flange 708A,708B with the axis of its corresponding seal assembly 706A,706B, the corresponding seal assembly 706A,706B is oriented with its corresponding flange 708A,708B to match connector end 708H (FIG. 8) of flange 708A,708B with connector end 702H (FIG. 8) of its corresponding seal assembly 706A, 706B.

In certain embodiments, each flange 708A,708B comprises a predetermined set of flange stud holes 710 (FIG. 8), each of the seal assemblies 706A,706B comprises a corresponding predetermined set of seal assembly stud holes 712 (FIG. 8), and spool assembly 700 comprises a corresponding set of couplers 802,808 configured to fit within flange stud holes 710 and seal assembly stud holes 712 to fasten flanges 708A,708B to their corresponding seal assemblies 706A, 706B. In such embodiments, flange stud holes 710 of each spool flange 708A,708B are aligned with seal assembly stud holes 712 of its corresponding seal assembly 706A,706B and each spool flange 708A,708B coupled to its corresponding seal assembly 706A,706B using couplers 802, which can be bolts, to secure each flange 708A,708B to its corresponding seal assembly 706A,706B.

Referring additionally to FIG. 9, in certain embodiments where stopper 106 further comprises a piston 902, groove 912 may be present within interior 104*b* (FIG. 1) of housing 104 and disposed intermediate first housing end 706E and second housing end 706F. Securing connector end 708H of flange 708A to connector end 706H of its corresponding seal assembly 706A may further comprise sliding piston 902 inside housing 104. Stopper 106 may also be moving or slidingly disposed in groove 912. In such embodiments, if pin 910 is present, where pin 910 may comprise a metal, stopper 106 may be moved or slid in groove 912 to make a physical contact between stopper 106 and seal 102 and tensioning increased between flange 708A,708B and each corresponding seal assembly 706A,706B. As tensioning increases, slip cone 906 move or slides with the movement of slip anchor 904 and a force generated by slip anchor 904 and slip cone 906 is allowed to shear away pin 910 due to the force acting on pin 910 when the force exceeds a predetermined shear strength of pin 910. Due to the shearing of pin 910, slip anchor 904 is allowed to move or slide relative to slip cone 906 as piston 902 continues to move into housing 104. Sliding slip cone 906 with the movement of slip anchor 904 typically comprises sliding slip cone 906 over slip anchor 904 to shear away the pin 910 and, due to a tapered angle of slip cone 906 and axial force from piston 902, moving slip anchor 904 downwards towards pipeline 110 as it slides.

Where slip anchor 904 comprises teeth 908, teeth 908 are typically allowed to penetrate into an outer surface of pipeline 110 and secure its corresponding seal assembly 706A,706B onto pipeline 110. As teeth 908 penetrate or otherwise grip the outer surface of pipeline 110, piston 902 moves further into housing 104 towards stopper 106 and axial force from piston 902 may be used to allow stopper 106 to compress seal 102.

Where seal 102 is disposed intermediate stopper 106 and an end flange 108 that comprises tapered edge 108a (FIG. 1) configured to allow movement of seal 102 while energizing seal 102, seal 102 may be axially compressed between stopper 106 and end flange 108. As tensioning between flange 708A,708B and its corresponding seal assembly 706A,706B is increased, seal 102 is energized. Depending on a shape of the taper angle provided on end flange 108, tapered edge 108a of the end flange 108 is then allowed to either bend or deflect seal 102 and seal 102 allowed to either penetrate or conform to an external surface of pipeline 110.

Seal assembly 706A may further comprise a plurality of housing seals 112 (FIG. 1), each or a subset of which can comprise a metal, with first housing seal 112 positioned on or in a groove between flange 708A,708B and its corresponding seal assembly 706A,706B at housing 104 in front section 804 of seal assembly 706A,706B to provide an efficient face sealing between flange 708A,708B and its corresponding seal assembly 706A,706B. Second housing seal 112 may then be positioned on or in a groove between end flange 108 and housing 104. Rear section 806 (FIG. 8) of seal assembly 706A,706B then provides a face sealing between end flange 108 and housing 104.

A reaction force may be generated with application of an axial load on seal assembly 706A,706B by means of its contact with a tapered edge of flange 108 and a bending/buckling of seal assembly 706A,706B created, thereby pushing seal assembly 706A,706B radially inward to envelope an outer surface of pipeline 110 using the reaction force generated at an interface of seal assembly 706A,706B and end flange 108.

As discussed above, seal assembly 706A may be provided with or without test port 1108 (FIG. 11A) where test port 1108, if present, allows checking pressure inflow between seal 102 and secondary sealing member 1102 (FIG. 11A) and further allows getting feedback about the efficiency of sealing in seal assembly 706A,706B. Second sealing member 1102 is generally only used in seal assembly 706A,706B with test port 1108 and not used in seal assembly 706A,706B without test port 1108.

Where seal assembly 706A lacks test port 1108, rigidly coupling the predetermined set of flanges 708A, 708B to their corresponding seal assemblies 706A,106B may comprise gripping between flanges 708A,708B in pipeline front section 804 (FIG. 11A) to make a rigid coupling between flange 708A and its corresponding seal assembly 706A and/or between flange 708B and its corresponding seal assembly 706B; gripping a corresponding seal assembly 706A,706B to uncontrolled surface 110, e.g., an outer surface of pipeline 110; and performing a sealing operation in rear section 806 (FIG. 10) of the corresponding seal assembly 706A at substantially the same time as in a corresponding seal assembly 706A without test port.

Where there is no test port 1108 (FIG. 11A), the couplers typically comprise one or more studs 802 (FIG. 10), each comprising a threaded end, and a corresponding set of fastening nuts 808. In these embodiments, coupling comprises fastening or otherwise tightening fastening each fastening nut 808 (FIG. 10) onto the threaded end of its corresponding stud 802. As tensioning of fastening nut 808 is initiated, the corresponding seal assembly 706A,706B and/or housing 104 is moved towards its corresponding spool flange 708A. In these embodiments, a first gripping operation and a second sealing operation are typically performed at the substantially same time in seal assembly 706A,706B without test port 1108 due to the tensioning of fastening nuts 808.

Figure 10:
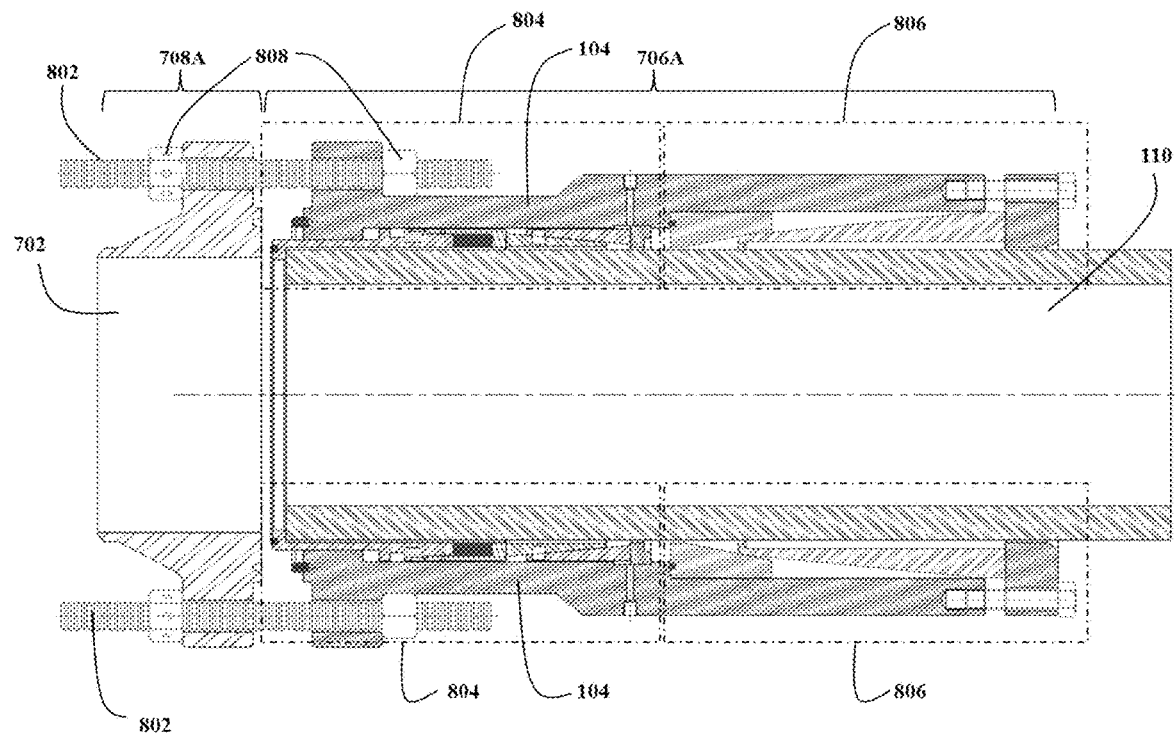
FIG. 10 illustrates a longitudinal cross section of a spool flange with an end connector with a test port.

Referring additionally to FIG. 10, in embodiments where at least one seal assembly 706A,706B comprises test port 1108 (FIG. 11A), seal assembly 706A,706B may be actuated from front section 804 of seal assembly 706A,706B and from rear section 806 of seal assembly 706A,706B by, at substantially the same time, performing a first gripping operation between flange 708A,708B in front section 804 of its corresponding seal assembly 706A,706B to make a rigid coupling between flange 708A,708B and its corresponding seal assembly 706A,706B, gripping seal assembly 706A, 706B onto uncontrolled surface 110, e.g. pipeline 110, and performing a sealing operation in rear section 806 of seal assembly 706A,706B. After mating flange 708A,708B to its corresponding seal assembly 706A,706B, the first gripping operation may be terminated.

In these embodiments where at least one seal assembly 706A,706B of the two seal assemblies 706A, 706B comprises test port 1108, a sealing operation may be performed to create elastomeric sealing between seal assembly 706A and its corresponding flange 708A by aligning spool assembly 702 with a longitudinal axis of pipeline 110 such that each flange 708A,708B and each corresponding seal assembly 706A,706B is aligned with the longitudinal axis. After aligning the axis of flanges 708A,708B with each corresponding seal assembly 706A, 706B, each seal assembly 706A,706B is oriented with its corresponding flange 708A, 708B to permit coupling of each seal assembly 706A,706B with its corresponding flange 708A,708B. In embodiments, stud holes 710 (FIG. 8) of flanges 708A,708B are also oriented with matching stud holes 712 (FIG. 8) of seal assemblies 706A,706B. Fasteners, e.g., studs 802 (FIG. 8), are inserted into stud holes 710 of flange 708A,708B and stud holes 712 of seal assembly 706A,706 which are then coupled and secured using fasteners, 802,808 (FIG. 8), e.g., by fastening and tensioning fastening nuts 808 onto corresponding studs 802. As tensioning of fastening nuts 808 is initiated, seal assembly 702 and/or housing 104 tends to move together, e.g., flanges 708A,708B move towards seal assemblies 706A,706B or vice-a-versa. As the securing progresses, housing seal 112, mounted on piston 902 (FIG. 9), is brought into contact with flange 708A to provide a sealing at an interface of flange 708A and seal assembly 706A. Housing 104 is allowed to continue to move towards flange 708A and piston 902 moved into housing 104 which compresses secondary sealing member 1102 (FIG. 11A), typically comprising an elastomeric seal that compresses and seals/locks the passage of fluids, resting secondary sealing member 1102 between piston 902 and piston end cap 1104 (FIG. 11A) disposed in interior 104b (FIG. 1). After a pre-determined amount of compression and movement of piston 902 occurs, piston locking ring 1106 (FIG.11A) may be used to arrest relative movement between piston 902 and piston end cap 1104 to set secondary sealing member 1102 to a desired compression level and position. In this manner, if used, secondary sealing member 1102 may be in a position in which secondary sealing member 1102 forms a seal due to the pre-determined amount of compression. Piston end cap 1104 may then be moved further into housing 104, such as due to the effect of piston locking ring 1106.

In embodiments where seal assembly 706A further comprises slip anchor 904 (FIG. 9) comprising teeth 908 (FIG. 9) configured to grip on to pipeline 110 when slip anchor 904 is in physical contact with piston end cap 1104 (FIG. 11A), slip cone 906, typically comprising a machined component to match a machined component of slip anchor 904 with a complimentary geometry designed to slip over each other, and deformable pin 910 disposed intermediate slip anchor 904 and slip cone 906 connecting slip anchor 904 and slip cone 906 and configured to guide slip cone 906 as it moves with the movement of slip anchor 904, piston end cap 1104 may be moved or slid into housing 104, further causing a complimentary sliding of the slip anchor 904 into the housing 104. Stopper 106 may be locked into an internal groove of seal assembly 706A and, once locked, used to disallow further movement of slip cone 906 into housing 104. Movement of slip anchor 904 can be disallowed until pin 910 is sheared away, e.g., using slip cone 906 sliding over slip anchor 904 to shear away pin 910, as further tensioning, e.g., of fastening nuts 808, continues, using a force acting pin 910 to shear off pin 910 when that force exceeds a shear strength of pin 910. Upon shearing of pin 910, slip anchor 904 may then be allowed to move relative to slip cone 906 and piston 902 allowed to continue to move into housing 104. In certain embodiments, when fastening nuts 808 are at a completely tensioned position, teeth 908 may penetrate into an outer surface of pipeline 110 to hold seal assembly 706A,706B onto pipeline 110 and help mate seal assembly 706A,706B with its corresponding flange 708A,708B. In these embodiments, once mated, housing seal 112 is typically energized at an interface of flange 708A and its piston 902. Additionally, second housing seal 112 may be provided on a groove between flange 708A and its corresponding housing 104 to provide an efficient face sealing between flange 708A and its corresponding seal assembly 706A.

In embodiments, referring to FIG. 12, rear section 806 (FIG. 10) of seal assembly 706A comprises seal 102 which further comprises a predetermined profile. Seal actuator 1202 is configured to axially push or move end flange 108 towards housing 104. After terminating a first operation gripping, a second sealing operation may be performed on rear section 806 by using seal actuator 1202 to axially load or compress seal 102 between wedge block 202 and end flange 108. Application of axial load on seal 102 generates a reaction force by means of contact between seal 102 and tapered surface 202c (FIG. 2) of wedge block 202 at an interface of seal 102 and wedge block 202, the reaction force used to create a bending/buckling on seal 102. Seal 102 is pushed, e.g., radially inward, to envelope an outer surface of pipeline 110. In certain embodiments, seal actuator 1202 comprises a predetermined set of bolts 1204 extending from an outer edge of end flange 108 through end flange 108 into housing 104, e.g., a threaded channel adapted to receive a threaded end of bolts 1204, in a direction parallel to a longitudinal axis of pipeline 110, where the predetermined set of bolts 1204 are radially arranged on a pitch circle diameter (PCD) of end flange 108 to generate a longitudinal force on seal 102. Torquing the predetermined set of bolts 1204 allows a sliding movement of end flange 108 towards housing 104 and axial force resulting from the predetermined set of bolts 1204 engaging end flange 108 onto housing 104 causes wedge block 202, which comprises a hardened machined surface which does not deform when subjected to axial force by the seal actuator 1202 and which comprises a tapered edge 202c depending on a design of seal 102, to allow bending or deflection of seal 102, as per the shape of the taper angle provided on the wedge block 202.

Referring now additionally to FIG. 10, in embodiments, seal 112 is disposed within rear section 806 of seal assembly 706A,706B and provides a face sealing at an interface of housing 104 and wedge block 202. In these embodiments, the sealing operation may further comprise performing a second sealing operation on rear section 806.

Further, as described herein, in embodiments seal actuator 1202 comprises end flange 108 and an end flange actuator that axially pushes or moves end flange 108 towards housing 104. In an embodiment, the end flange actuator comprises one or more bolts 1204 provided on or through end flange 108, typically oriented in a direction parallel to a longitudinal axis of pipeline 110 and arranged radially on a pitch circle diameter (PCD) of end flange 108 to effectively generate a longitudinal force on seal 102. In these embodiments, bolts 1204 are inserted from or through end flange 108 into corresponding bolt receivers, e.g., 114b (FIG. 1), of housing 104. Torquing bolts 1204 allows a sliding movement of end flange 108 towards housing 104, e.g., a required axial force may be applied by means of multiple bolts 1204 pushing end flange 108 onto housing 104 as bolts 1204 are tightened into housing 104.

Referring additionally to FIGS. 11A and 11B, where spool assembly 700 further comprises stopper 106 comprising piston 902 slidingly disposed within housing 104, piston end cap 1104, and secondary sealing member 1102 disposed between piston 902 and piston end cap 1104, movement of piston 902 into housing 104 may be used to compress secondary sealing member 1102 to a pre-determined amount of compression between piston 902 and piston end cap 1104 and secondary sealing member 1102 allowed to rest between piston 902 and piston end cap 1104. After the pre-determined amount of compression and movement of piston 902 occurs, piston locking ring 1106 may be used to arrest relative movement between piston 902 and piston end cap 1104 to form a desired sealing due to the pre-determined amount of compression.

Figure 13A:
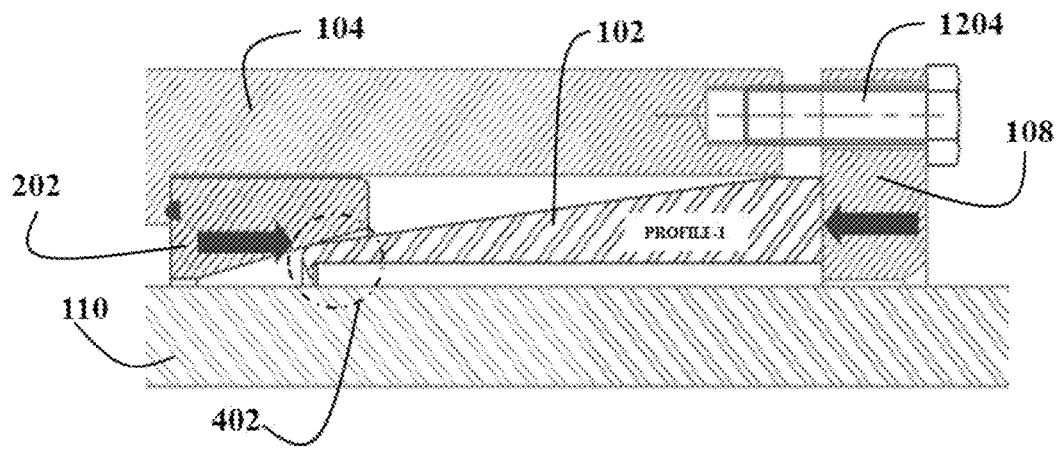
FIG. 13A illustrates a sectional view of the first embodiment of the seal in an end connector with test port, in a non-energized condition
Figure 13B:
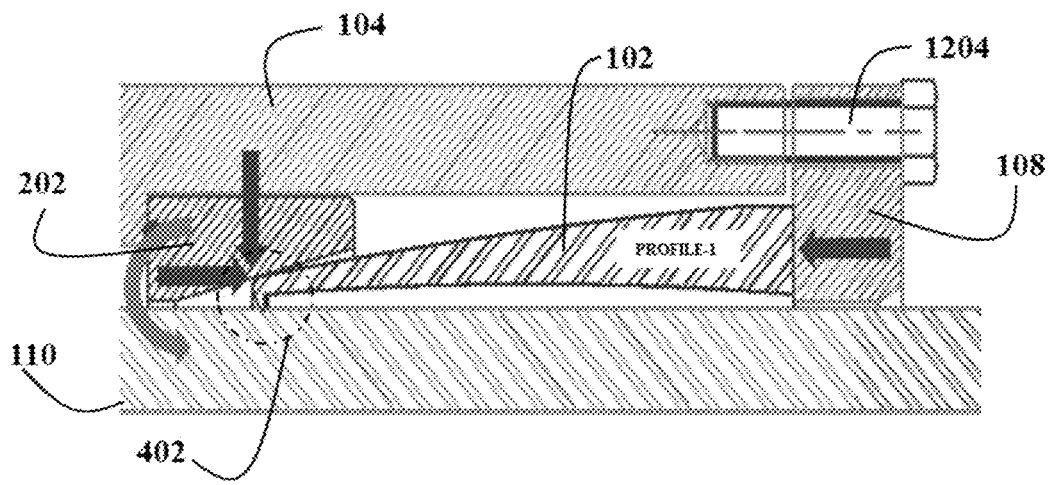
FIG. 13B illustrates the sectional view in an energized condition.

Referring now to FIGS. 13A and 13B, spool assembly 702 (FIG. 7) may be secured intermediate two separate portions 110a,110b (FIG. 7) of pipeline 110 (FIG. 7) by using a plurality of fasteners, e.g., bolts 1204, which extend from an exterior of end flange 108 through and into housing 104, e.g., into complementarily threaded channels such as threaded bolt receivers 114b (FIG. 1) in housing 104. Where seal tapered edge 102a (FIG. 1) further comprises conical end 402, fasteners 1204 may be tightened to apply axial force on end flange 108 to move it towards seal 102 and the acting axial force used to generate a reaction force acting on seal 102, where conical end 402 is pushed along tapered/wedged surface 202c (FIG. 2) of wedge block 202. In this embodiment, seal 102 is bent and housing seal 112 pushed radially inwards as a result of reaction forces from wedge block 202, resulting in moving conical end 402 radially inwards towards an external surface of pipeline 110.

In addition, one or more leak proof passages may be formed by penetrating an external surface of pipeline 110 by seal 102, by conforming seal 102 around the external surface of the pipeline 110, or both.

Where seal assembly 706A,706B further comprises rear section 806 (FIG. 9) as described above, and where wedge block 202 is of a sufficient hardness such that wedge block 202 does not deform when subjected to axial force by seal actuator 1202, tightening of fasteners 1204 may apply an axial force on end flange 108 to move it towards seal 102 and the acting axial force used to generate a reaction force acting on seal 102. A conical reaction surface provided by wedge block 202 and tapered surface 202c (FIG. 2) of end flange 108 is used to guide seal 102 at both ends of seal 102 and the resultant forces used to generate a twisting moment in seal 102 that pushes seal 102 radially inwards because of reaction force from wedge block 202 and radially outwards because of wedging action from end flange 108. Seal 102, when in contact pipeline 110, is allowed to either penetrate an outer surface of pipeline 110 or conform around the external surface of pipeline 110 to form one or more leak proof passages.

Figure 15A:
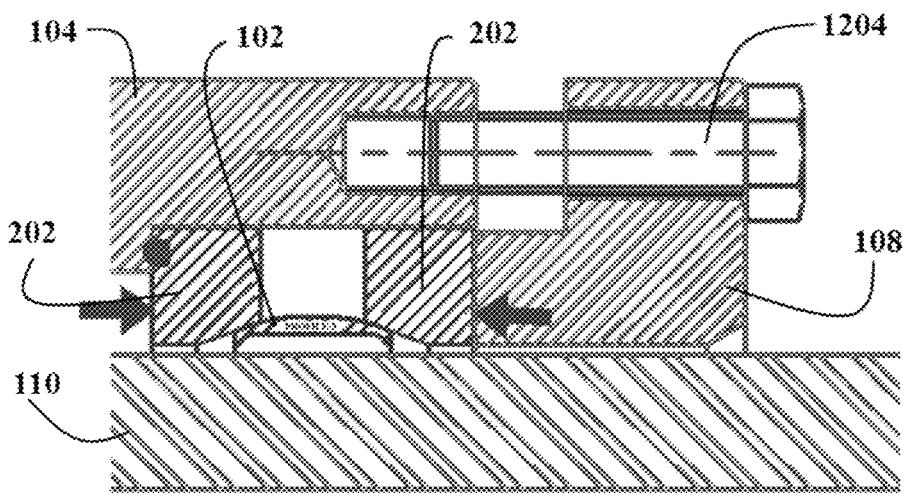
FIG. 15A illustrates a sectional view of the third embodiment of the seal in a non-energized condition and FIG. 15B illustrates the sectional view in an energized condition.
Figure 15B:
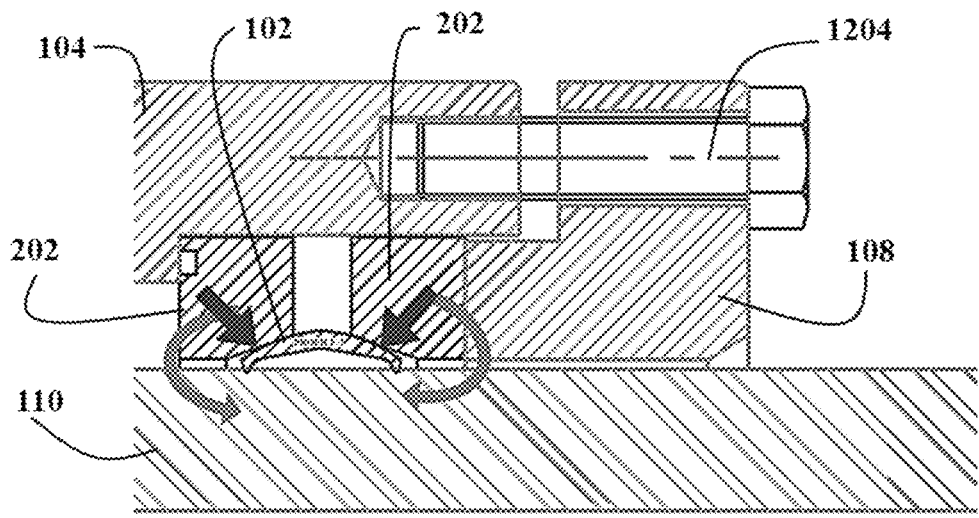

Referring to FIGS. 15A and 15B, if two wedge blocks 202 of a sufficient hardness are used such that wedge blocks 202 do not deform when subjected to axial force by seal actuator 1202, and seal 102 is sandwiched between the two wedge blocks 202 due to the axial force from end flange 108, on tightening fasteners 1204 to apply an axial force on end flange 108 to move it towards the seal 102 the resultant reaction forces can be used to push edges of seal 102 from both ends radially inwards towards external surface of pipeline 110, leading to either seal 102 penetrating into the external surface of pipeline 110 or conforming to the external surface of pipeline 110, depending upon the hardness of the seal 102, to form one or more leak proof passages and terminating a second sealing operation.

As will be apparent to one of ordinary skill, that which applies above to flange 708A and its associated seal assembly 706A may apply to, and be repeated in the same manner as discussed above, to connect flange 708B with its associated seal assembly 706B.

The foregoing claimed invention and description of the inventions are illustrative and explanatory. Various changes in the size, shape, and materials, as well as in the details of the illustrative construction and/or an illustrative method may be made without departing from the spirit of the invention.

What is claimed:

1. A spool assembly, comprising:
   a. a substantially tubular conduit comprising a first conduit end and a second conduit end;
   b. a predetermined set of flanges, a first flange of the predetermined set of flanges disposed at the first conduit end of the substantially tubular conduit and a second flange of the predetermined set of flanges disposed at the second conduit end of the substantially tubular conduit; and
   c. two seal assemblies, each seal assembly configured to mate with a corresponding flange of the two flanges, each seal assembly comprising:
      i. a housing comprising:
         1. an interior defining an inner annulus adapted to fit over an outer surface of a pipeline;
         2. a first housing end;
         3. a fluid inlet disposed proximate the first housing end;
         4. a second housing end; and
         5. a fluid outlet disposed proximate the second housing end; and
      ii. a stopper comprising an interior end exposed to the interior of the housing; and
      iii. an end flange disposed at a first end of the housing and fixed to the housing, the end flange configured to mate with a corresponding flange of the two flanges and comprising a flange tapered edge angled towards the interior of the housing and a fluid outlet, the end flange comprising an interior end and an exterior end disposed distally from the interior end of the end flange;
      iv. a housing seal disposed intermediate the housing and the end flange; and
      v. a seal disposed within the housing and in physical contact with the interior end of the stopper, the seal adapted to be in communication with an uncontrolled surface, the seal comprising a seal tapered edge in contact with and configured to cooperatively complement the flange tapered edge, the seal configured to selectively allow or block fluid flow at a predefined set of fluid leakage paths between the fluid inlet and the fluid outlet;
      vi. a machined slip anchor comprising a griping surface, the machined slip anchor adapted to connect to the stopper and configured to grip onto the outer surface of the pipeline;
      vii. a machined slip cone, the machined slip anchor and the machined slip cone comprising a complementary geometry adapted to allow the machined slip anchor and the machined slip cone to slip over each other; and
      viii. a pin disposed intermediate the machined slip anchor and machined slip cone, the pin forming a deformable but substantially rigid connection between the machined slip anchor and machined slip cone, the pin aligned to guide the machined slip cone as it slides with movement of the machined slip anchor and to be sheared away due to a force acting on the pin when the force exceeds a predetermined shear strength of the pin, the pin configured to disallow sliding of the machined slip anchor until the pin is shorn and allow the machined slip anchor to slide relative to the machined slip cone and a piston slidingly disposed within the housing to continue to move into the housing once the pin is shorn.

2. The spool assembly of claim 1, wherein the predetermined set of flanges comprises a weld neck flange.

3. The spool assembly of claim 1, wherein the seal assembly further comprises:
   a. a plurality of metallic seals, a first metallic housing seal of the plurality of metallic seals positioned in a groove between a corresponding flange of the seal assembly and the housing in a front section of the seal assembly to provide face sealing between the corresponding flange and its corresponding seal assembly and a second metallic housing seal of the plurality of metallic seals positioned on the groove between the end flange and the housing; and b. a rear section of the corresponding seal assembly, the rear section defining a face sealing interface between the end flange and the housing.

4. A method of repairing a pipeline using a spool assembly comprising a substantially tubular conduit that comprises a first conduit end and a second conduit end; a predetermined set of flanges, a first flange of the predetermined set of flanges disposed at the first conduit end of the substantially tubular conduit and a second flange of the predetermined set of flanges disposed at the second conduit end of the substantially tubular conduit; two seal assemblies, each seal assembly configured to mate with corresponding flange of the two flanges, each seal assembly comprising a housing that comprises an interior defining an inner annulus adapted to fit over an outer surface of the pipeline, a first housing end, a fluid inlet disposed proximate the first housing end, a second housing end, a fluid outlet disposed proximate the second housing end; a stopper comprising an interior end exposed to the interior; and an end flange disposed at a first end of the housing and fixed to the housing, the end flange configured to mate with a corresponding flange of the two flanges and comprising a flange tapered edge angled towards an interior of the housing and a fluid outlet, the end flange comprising an interior end and an exterior end disposed distally from the interior end; a housing seal disposed intermediate the housing and the end flange; a housing seal disposed within the housing and in physical contact with the interior end of the stopper, the seal adapted to be in communication with an uncontrolled surface, the seal comprising a seal tapered edge in contact with and configured to cooperatively complement the flange tapered edge, the seal configured to selectively allow fluid flow between the fluid inlet and the fluid outlet and selectively block fluid flow at a predefined set of fluid leakage paths between the fluid inlet and the fluid outlet, a machined slip anchor comprising a griping surface, the slip anchor connected to the stopper and configured to grip onto the outer surface of the pipeline; a machined slip cone, the machined slip anchor and the machined slip cone comprising a complementary geometry adapted to allow the machined slip anchor and the machined slip cone to slip over each other; and a pin disposed intermediate the machined slip anchor and machined slip cone, the pin forming a deformable but substantially rigid connection between the machined slip anchor and machined slip cone, the pin aligned to guide the machined slip cone as it slides with movement of the machined slip anchor and to be sheared away due to a force acting on the pin when the force exceeds a predetermined shear strength of the pin, the pin configured to disallow sliding of the machined slip anchor until the pin is shorn and allow the machined slip anchor to slide relative to the machined slip cone and a piston slidingly disposed within the housing to continue to move into the housing once the pin is shorn, the method comprising:

a. attaching one flange of the predetermined set of flanges at each end of the substantially tubular conduit;

b. positioning the substantially tubular conduit with its attached predetermined set of flanges proximate a damaged portion of the pipeline, the pipeline comprising a first pipeline section and a second pipeline section separated from the first pipeline section at a distance defining an open pipeline area encompassing the damaged portion of the pipeline;

c. deploying the two seal assemblies to a location proximate the open pipeline area;

d. securing a first seal assembly of the two seal assemblies onto an open end of the first pipeline section proximate the pipeline open area and a second seal assembly of the two seal assemblies onto an open end of the second pipeline section proximate the pipeline open area;

e. aligning the substantially tubular conduit and the predetermined set of flanges with a longitudinal axis of the pipeline that extends from the first pipeline section through the open pipeline area on through the second pipeline section; and f. securing the substantially tubular conduit intermediate the two separate portions of the pipeline by coupling the substantially tubular conduit and the predetermined set of flanges to the two seal assemblies by securing the first flange to the first seal assembly and securing the second flange to the second seal assembly.

5. The method of repairing a pipeline using a spool assembly of claim 4, wherein the spool assembly further comprises a groove within an interior surface of the housing disposed intermediate the first housing end and the second housing end and the stopper is slidingly disposed in the groove, the method further comprising using the groove to guide movement of the stopper within the housing.

6. The method of repairing a pipeline using a spool assembly of claim 5, wherein the pin further comprises a metal, the method further comprising:

a. moving the stopper in the groove to make a physical contact between the stopper and the seal assembly;

b. increasing tensioning between the flange and its corresponding seal assembly;

c. as the tensioning increases,
  i. sliding the machined slip cone with the movement of the machined slip anchor; and
  ii. allowing a force generated by the machined slip anchor and the machined slip cone to shear away the pin due to the force acting on the pin when the force exceeds a predetermined shear strength of the pin; and d. due to the shearing of the pin, moving the machined slip anchor relative to the machined slip cone as the piston continues to move into the housing.

7. The method of repairing a pipeline using a spool assembly of claim 6, wherein:

a. sliding the machined slip cone with the movement of the machined slip anchor comprises the machined slip cone sliding over the machined slip anchor to shear away the pin; and b. due to a tapered angle of the machined slip cone and axial force from the piston, moving the machined slip anchor downwards towards the pipeline as it slides.

8. The method of repairing a pipeline using a spool assembly of claim 6, wherein the machined slip anchor further comprises teeth, the method further comprising:

a. securing the seal assembly on to the pipeline by allowing the teeth to penetrate into an outer surface of the pipeline;

b. moving the piston further into the housing towards the stopper; and c. using axial force from the piston to allow the stopper to compress the seal assembly.

9. The method of repairing a pipeline using a spool assembly of claim 4, wherein securing the first flange or the second flange to its corresponding seal assembly comprises:

a. gripping the corresponding seal assembly onto an outer surface of the pipeline to which the corresponding seal assembly is exposed; and b. sealing the corresponding seal assembly to the outer surface of the pipeline to which the corresponding seal assembly is exposed.

10. The method of repairing a pipeline using a spool assembly of claim 4, further comprising forming a leak proof passage by penetrating an external surface of the pipeline by the seal, conforming the seal around the external surface of the pipeline, or both.

11. The method of repairing a pipeline using a spool assembly of claim 4, further comprising:
   a. suspending the spool assembly from a topside vessel prior to deployment of the spool assembly;
   b. controlling orientation of the substantially tubular conduit, either through the topside vessel or via a remotely operated vehicle (ROV), by aligning an axis of each flange with an axis of its corresponding seal assembly;
   c. after aligning the axis of the flange with the axis of its corresponding seal assembly, orienting the corresponding seal assembly with the flange to match a first connector end of the flange with a second connector end of the corresponding seal assembly; and
   d. securing the first connector end of the flange to the second connector end of the corresponding seal assembly.

12. The method of repairing a pipeline using a spool assembly of claim 11 wherein the stopper further comprises a piston and wherein securing each first connector end of the flange to the second connector end of the corresponding seal assembly further comprises sliding the piston inside the housing.

13. The method of repairing a pipeline using a spool assembly of claim 4, wherein the seal is disposed intermediate the stopper and an end flange which comprises a tapered edge configured to allow movement of the seal assembly while energizing the seal, the method further comprising:
   a. axially compressing the seal between the stopper and the end flange by increasing tension between the flange and its corresponding seal assembly;
   b. as tensioning between the flange and its corresponding seal assembly is increased, energizing the seal;
   c. depending on a shape of the taper angle provided on the end flange, allowing the tapered edge of the end flange to either bend or deflect the seal; and
   d. allowing the seal to either penetrate or conform to an external surface of the pipeline.

14. The method of repairing a pipeline using a spool assembly of claim 4, further comprising:
   a. generating a reaction force with application of an axial load on the seal assembly by means of its contact with a tapered edge of the flange; and
   b. creating a bending/buckling on the seal assembly; and
   c. pushing the seal assembly radially inward to envelope an outer diameter of the pipeline using the reaction force generated at an interface of the seal assembly and the end flange.

15. The method of repairing a pipeline using a spool assembly of claim 4, wherein the seal assembly lacks a test port and the seal assembly further comprises a rear section, comprising a seal, a seal actuator comprising an end flange actuator that axially pushes or moves the end flange towards the housing, a plurality of bolts insertable from the end flange into the housing, and a wedge block of a sufficient hardiness such that the wedge block does not deform when subjected to an axial force by the seal actuator, the method further comprising:
   a. coupling the substantially tubular conduit and the predetermined set of flanges to the two seal assemblies further comprises gripping the seal assembly to an uncontrolled surface of the pipeline between the seal assembly and its corresponding flange in a pipeline front section to couple the seal assembly to its corresponding flange; and
   b. performing a sealing operation, comprising securing the seal of the seal assembly about the uncontrolled surface of the pipeline in a rear section of the seal assembly at substantially the same time as in the corresponding seal assembly without test port.

16. The method of repairing a pipeline using a spool assembly of claim 15, wherein:
   a. the housing seal is disposed within a rear section of the seal assembly and provides a face sealing at an interface of the housing and the wedge block; and
   b. the sealing operation further comprises performing a second operation sealing operation on the rear section.

17. The method of repairing a pipeline using a spool assembly of claim 4, wherein a seal assembly of the two seal assemblies comprises a test port extending from an interior of its seal assembly to a surface of its seal assembly, the method further comprising:
   a. actuating the seal assembly from a front section of the seal assembly and from a rear section of the seal assembly by, at substantially the same time,
      i. performing a first gripping operation between a flange in the front section of its corresponding seal assembly to make couple the flange and its corresponding seal assembly and to grip the seal assembly to an uncontrolled surface of the pipeline; and
      ii. performing a sealing operation in the rear section of the seal assembly; and
   b. after mating the flange and its corresponding seal assembly, terminating the first gripping operation.

18. The method of repairing a pipeline using a spool assembly of claim 4, wherein securing the spool assembly intermediate the two separate portions of the pipeline uses a plurality of bolts which extend from an exterior of the end flange through the housing, the seal tapered edge further comprises a conical pointed end, and the seal assembly further comprises a rear section, comprising a seal, a seal actuator comprising an end flange actuator that axially pushes or moves the end flange towards the housing, a plurality of bolts insertable from the end flange into the housing, and a wedge block of a sufficient hardiness such that the wedge block does not deform when subjected to axial force by the seal actuator and comprising a tapered/wedged surface, the method further comprising:
   a. tightening the bolts to apply an axial force on the end flange to move it towards the seal;
   b. using the axial force to generate a reaction force acting on the seal, the conical pointed end being pushed along the tapered/wedged surface of the wedge block;
   c. bending the seal and pushing the housing seal radially inwards, as a result of the reaction forces from the wedge block, resulting in moving the conical pointed end or nose radially inwards towards an external surface of the pipeline.

19. The method of repairing a pipeline using a spool assembly of claim 4, further comprising forming a leak proof passage by penetrating an external surface of the pipeline by the seal, conforming the seal assembly around the external surface of the pipeline, or both.

20. The method of repairing a pipeline using a spool assembly of claim 4, wherein the seal assembly further comprises a rear section, comprising a seal, a seal actuator comprising an end flange actuator that axially pushes or moves the end flange towards the housing, a plurality of bolts insertable from the end flange into the housing, and a wedge block of a sufficient hardiness such that the wedge block does not deform when subjected to an axial force by the seal actuator, the method further comprising:
   a. tightening the bolts, thereby applying axial force on the end flange to move towards the seal;
   b. using the acting axial force to generate a reaction force acting on the seal;
   c. using a conical reaction surface provided by the wedge block and a tapered surface of the end flange to guide the seal at both ends of the seal;
   d. using the resultant forces to generate a twisting moment in the seal that pushes the seal radially inwards because of reaction force from the wedge block and radially outwards because of wedging action from end flange; and
   e. allowing the seal when in contact with the pipeline to either penetrate an outer surface of the pipeline or conform around an external surface of the pipeline to form a leak proof passage.

* * * * *